(12) United States Patent
Okada (10) Patent No.: US 7,804,071 B2
(45) Date of Patent: Sep. 28, 2010

(54) IMAGE DETECTION DEVICE

(75) Inventor: Yoshihiro Okada, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 176 days.

(21) Appl. No.: 12/219,634

(22) Filed: Jul. 25, 2008

(65) Prior Publication Data

US 2009/0032719 A1 Feb. 5, 2009

(30) Foreign Application Priority Data

Jul. 31, 2007 (JP) ............................. 2007-199568

(51) Int. Cl.
*H01L 27/146* (2006.01)

(52) U.S. Cl. ................................. 250/370.09

(58) Field of Classification Search ............ 250/370.01, 250/370.08, 370.09
See application file for complete search history.

(56) References Cited

U.S. PATENT DOCUMENTS

2003/0218589 A1* 11/2003 Watanabe et al. ............. 345/87

FOREIGN PATENT DOCUMENTS

| JP | A 2004-33659 | 2/2004 |
|----|--------------|--------|
| JP | 2006-126798 A | 5/2006 |

\* cited by examiner

*Primary Examiner*—David P Porta
*Assistant Examiner*—Mark R Gaworecki
(74) *Attorney, Agent, or Firm*—Chad M. Herring; Sheldon J. Moss (57) ABSTRACT

An image detection device includes a sensor panel and a light. The sensor panel includes a semiconductor layer, which is formed on a substrate formed of a member having a light transmitting property and generates charges in response to X-rays radiated thereto, two pairs of electrodes each pair disposed in confrontation with each other, and a plurality of accumulating portions formed between the semiconductor layer and the substrate to accumulate the charges generated to the semiconductor layer as the information of the pixels constituting an image. The light radiates light to the surface of the sensor panel on the substrate side thereof. The respective electrodes of the accumulating portions are formed so that light having at least a predetermined intensity is radiated from the light to the regions of the semiconductor layer where the accumulating portions are formed.

9 Claims, 12 Drawing Sheets

IMAGE DETECTION DEVICE

CROSS-REFERENCE TO RELATED APPLICATION

This application claims priority under 35 USC 119 from Japanese Patent Application No. 2007-199568, the disclosure of which is incorporated by reference herein.

BACKGROUND OF THE INVENTION

1. Field of the Invention

The present invention relates to an image detection device, and more particularly to an image detection device for detecting an image by accumulating the charges generated by radiating X-rays to a semiconductor layer as the information of the respective pixels constituting an image.

2. Description of the Invention

Recently, radiation image detection devices such as FPDs (flat panel detector) have come into practical use, and each of the detection devices has X-ray sensitive layer formed on a TFT (thin film transistor) active matrix substrate and can directly convert X-ray information into digital data. The FPDs have been in widespread use rapidly because it has a merit in that they can instantly confirm an image and can also confirm a motion picture as compared with imaging plates according to a related art.

Figure 10:
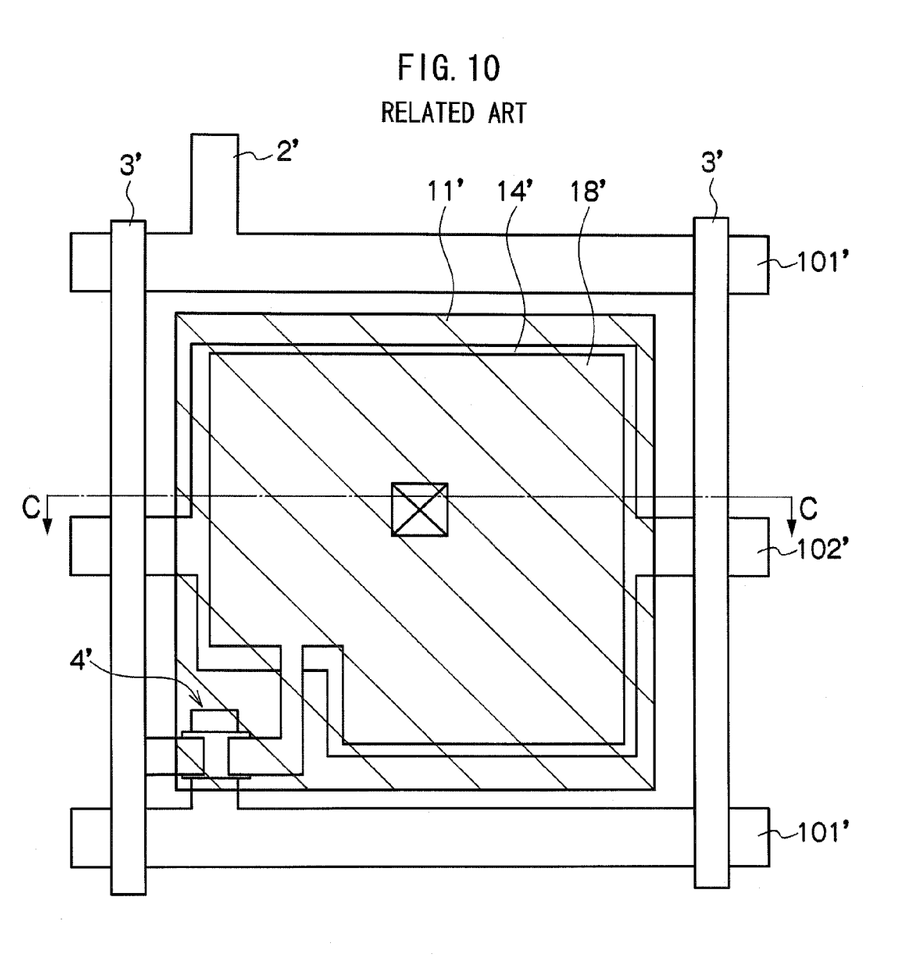
FIG. 10 is a plan view showing a structure of the TFT active matrix substrate according to a related art.

First, a radiation image detection device 100' according to a related art acting as the FPD will be explained using FIGS. 10 and 11. Note that FIG. 11 shows a sectional view taken along the line C-C of FIG. 10.

Figure 11:
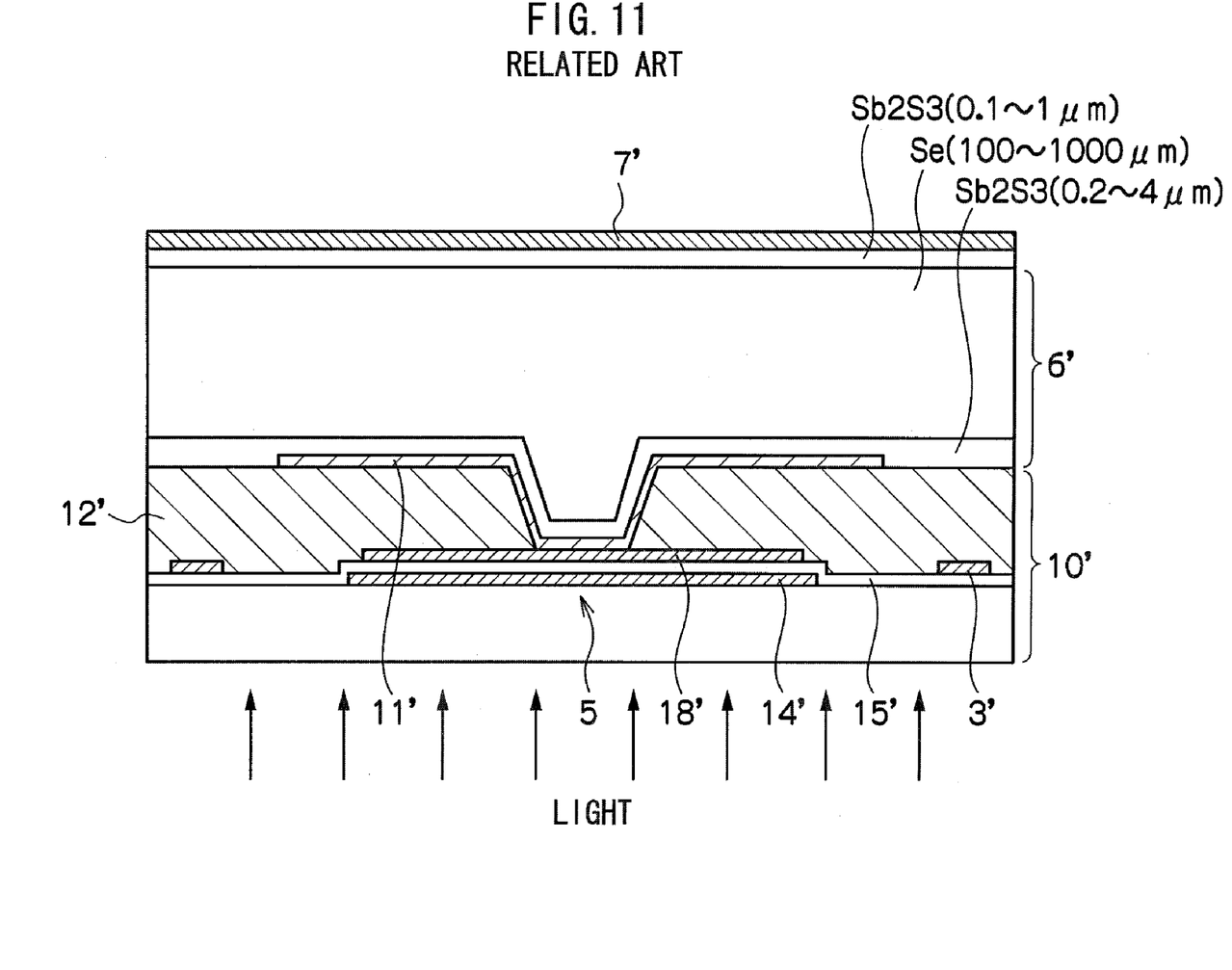
FIG. 11 is a sectional view taken along the C-C line of FIG. 10.

As shown in FIG. 11, the radiation image detection device 100' according to a related art is arranged such that a semiconductor film 6' with electromagnetic wave conductivity is formed on a TFT active matrix substrate 10' and a bias electrode 7' is sequentially formed thereon. The bias electrode 7' is connected to a high-voltage power supply.

The semiconductor film 6' is an amorphous a-Se film containing selenium as a main component and having a film thickness of 100 to 1000 μm, and when X-rays are radiated to the semiconductor film 6', charges are generated in the film.

Next, an operating principle of the radiation image detection device 100' according to a related art will be explained.

When X-rays are radiated from an upper portion of FIG. 11, charges are generated in the semiconductor film 6'. The positive holes in the generated charges are collected to a charge collection electrode 11' by a bias between a bias electrode 7' and the charge collection electrode 11' and accumulated to a charge accumulation capacitance 5' electrically connected with the charge collection electrode 11'. Since the semiconductor film 6' generates a different amount of charges according to the amount of the X-rays, the charges according to the image information carried by the X-rays are accumulated to the charge accumulation capacitances of the respective pixels. Thereafter, signals for turning ON a TFT switch 4' are sequentially applied through scan wirings 101' shown in FIG. 10, and the charges accumulated in the respective charge accumulation capacitance 5' are fetched through data wirings 3'.

Incidentally, this type of the radiation image detection device 100' has a problem in that since a trap is generated in the semiconductor film 6', the generated charges cannot be collected well by the charge collection electrode 11' and thus sensitivity is deteriorated. Further, when X-rays are incident on the device 100', a phenomenon called ghosting may occur by which the sensitivity is deteriorated according to the incident intensity of the radiated X-rays and takes long time for recovery.

To cope with the above problem, Japanese Patent Application Laid-Open (JP-A) No. 2004-33659 discloses a technology for suppressing the deterioration of the sensitivity by disposing a light generator (backlight unit) on the back surface of the TFT active matrix substrate 10' and radiating light to the TFT active matrix substrate 10' from the light generator.

However, when it is contemplated to apply this type of the radiation image detection device as, for example, a medical X-ray image detection device, the arrangement disclosed in JP-A No. 2004-33659 is disadvantageous in that sensitivity stability and remaining image characteristics are insufficient.

SUMMARY OF THE INVENTION

An object of the present invention, which was made to solve the above problems, is to provide an image detection device that improves sensitivity stability and remaining image characteristics.

To achieve the above object, in a first aspect of the invention, an image detection device includes a sensor panel including a semiconductor layer, which is formed on a substrate formed of a member having a light transmitting property and generates charges in response to X-rays radiated thereto, two pairs of electrodes each pair disposed in confrontation with each other, and a plurality of accumulating portions formed between the semiconductor layer and the substrate to accumulate the charges generated to the semiconductor layer as the information of the pixels constituting an image, and a light for radiating light to the surface of the sensor panel on the substrate side thereof, wherein the respective electrodes of the accumulating portions are formed such that light having at least a predetermined intensity is radiated from the light to the regions of the semiconductor layer where the accumulating portions are formed.

In the first aspect, the sensor panel includes the semiconductor layer, which is formed on the substrate formed of the member having the light transmitting property and generates the charges in response to the X-rays radiated thereto, the two pairs of electrodes each pair disposed in confrontation with each other, and the plurality of accumulating portions formed between the semiconductor layer and the substrate to accumulate the charges generated to the semiconductor layer as the information of the pixels constituting the image, and light is radiated to the surface of the sensor panel on the substrate side thereof by the light.

In the invention, each of the electrodes of the accumulating portions are formed therethrough so that the light having at least the predetermined intensity is radiated from the light to the regions of the semiconductor layer where the accumulating portions are formed.

As described above, according to the first aspect, since the respective electrode of the accumulating portions are formed such that the light having at least the predetermined intensity is radiated from the light to the regions where the accumulating portions of the semiconductor layer are formed, the charges, which are trapped to the regions where the accumulating portions of the semiconductor layer are formed, are excited by the light from the light. As a result, sensitivity stability and remaining image characteristics may be improved.

In a second aspect of the invention, each of the electrodes of the accumulating portions may have an opening formed therethrough so that the light having at least the predetermined intensity is radiated from the light to the regions of the semiconductor layer where the accumulating portions are formed in the first aspect.

In a third aspect of the invention, the opening may be formed in a slit shape in the second aspect.

In a fourth aspect of the invention, the opening may be formed in a rectangular shape in the second aspect.

In a fifth aspect of the invention, a plurality of openings may be formed in any of the second aspect to the fourth aspect.

In a sixth aspect of the invention, each of the electrodes of the accumulating portions may be divided into a plurality of electrodes in the first aspect.

In a seventh aspect of the invention, each of the electrodes of the accumulating portions may be formed of a conductive member having a light transmitting property in the first aspect.

In an eighth aspect of the invention, the semiconductor layer may be include amorphous selenium as a main component.

In a ninth aspect of the invention, the semiconductor layer may be formed by layering a plurality of semiconductor layers each includes a different material.

As described above, according to the invention, since the respective electrode of the accumulating portions are formed such that the light having at least the predetermined intensity is radiated from the light to the regions where the accumulating portions of the semiconductor layer are formed, the invention has an excellent effect that sensitivity stability and remaining image characteristics can be improved.

DETAILED DESCRIPTION OF THE INVENTION

An exemplary embodiment of the invention will be explained below referring to drawings. Note that the invention will be explained below as to a case in which it is applied to a radiation image detection device 100 having X-ray sensitive layer formed on a TFT active matrix substrate and directly converting X-ray information into digital data.

Figure 1:
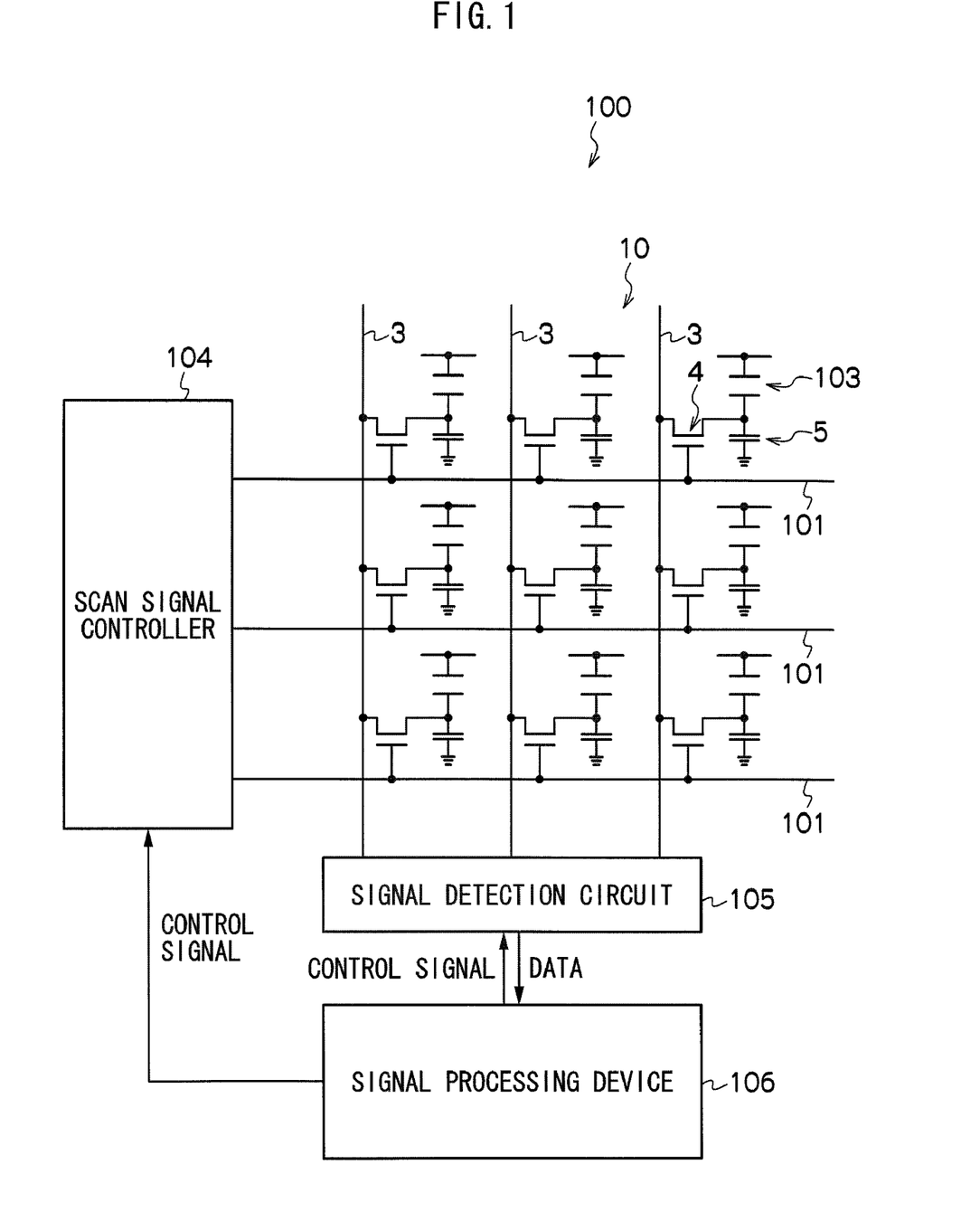
FIG. 1 is an arrangement view showing an overall arrangement of a radiation image detection device according to an exemplary embodiment of the present invention.

FIG. 1 shows an overall arrangement of the radiation image detection device 100 according to the exemplary embodiment of the invention.

As shown in FIG. 1, the radiation image detection device 100 according to the exemplary embodiment has a TFT active matrix substrate 10.

The TFT active matrix substrate 10 has a multiplicity of pixels two-dimensionally disposed thereto. Each of the pixels is composed of an image sensor unit 103, which is composed of a bias electrode, a semiconductor film, and a charge collection electrode to be described later, a charge accumulation capacitance 5 for accumulating the charge signal detected by the image sensor unit 103, and a TFT switch 4 for reading out the charges accumulated in the charge accumulation capacitance 5.

Further, the TFT active matrix substrate 10 has a plurality of scan wirings 101 for turning ON/OFF the TFT switch 4 and a plurality of data wirings 3 for reading out the charges accumulated in the charge accumulation capacitance 5 each disposed thereto, and one of the electrodes of the charge accumulation capacitance 5 is grounded through a wiring so that it is set to a ground level. Note that FIG. 1 is shown assuming that one of the electrodes of respective charge accumulation capacitances 5 is connected to the ground.

A signal detection circuit 105 is connected to the respective data wirings 3 to detect the charges flown out to the data wirings 3 as electric signals. A scan signal controller 104 is connected to the respective scan wirings 101 to output a control signal for turning ON/OFF the TFT switch 4 to the respective scan wirings.

The signal detection circuit 105 has an amplification circuit, which is built therein and amplifies the voltage level of the electric signal input to each data wiring 3, and detects the amount of charges accumulated in the respective charge accumulation capacitances 5 as the information of the respective pixels constituting an image by amplifying the electric signals input from the respective data wirings 3 and detecting the voltage levels of the electric signals.

A signal processing device 106 is connected to the signal detection circuit 105 and the scan signal controller 104 to subject the electric signal detected by the signal detection circuit 105 to predetermined processing as well as to output a control signal, which shows signal detection timing, to the signal detection circuit 105, and to output a control signal, which shows a scan signal output timing, to the scan signal controller 104.

Figure 2:
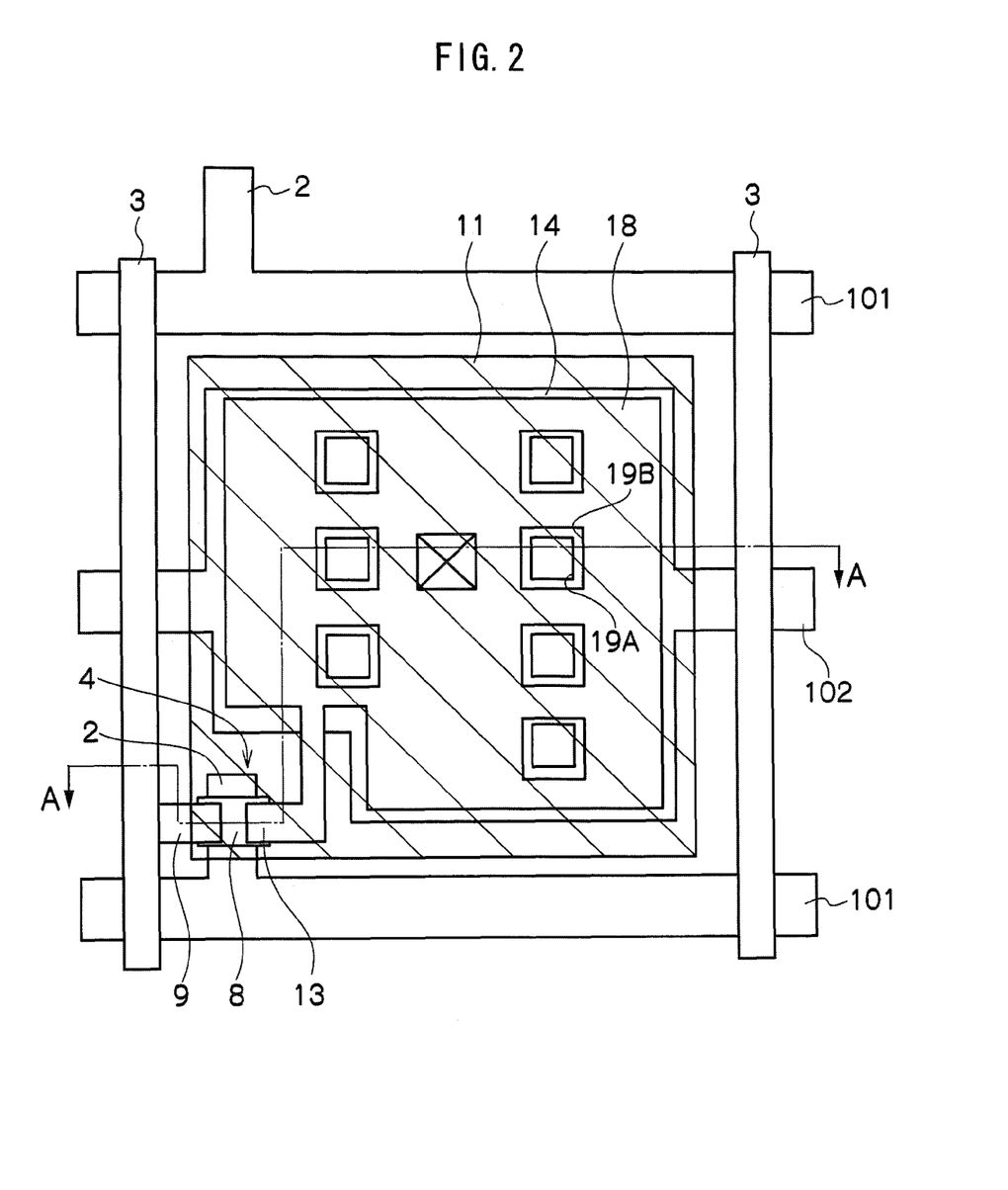
FIG. 2 is a plan view showing a structure of one pixel unit of a TFT active matrix substrate according to the exemplary embodiment of the present invention.

Next, the TFT active matrix substrate 10 according to the exemplary embodiment will be explained in more detail referring to FIGS. 2 and 3. Note that FIG. 2 is a plan view showing a structure of one pixel unit of the TFT active matrix substrate 10 according to the exemplary embodiment, and FIG. 3 is a sectional view of the TFT active matrix substrate 10 taken along the line A-A of FIG. 2.

Figure 3:
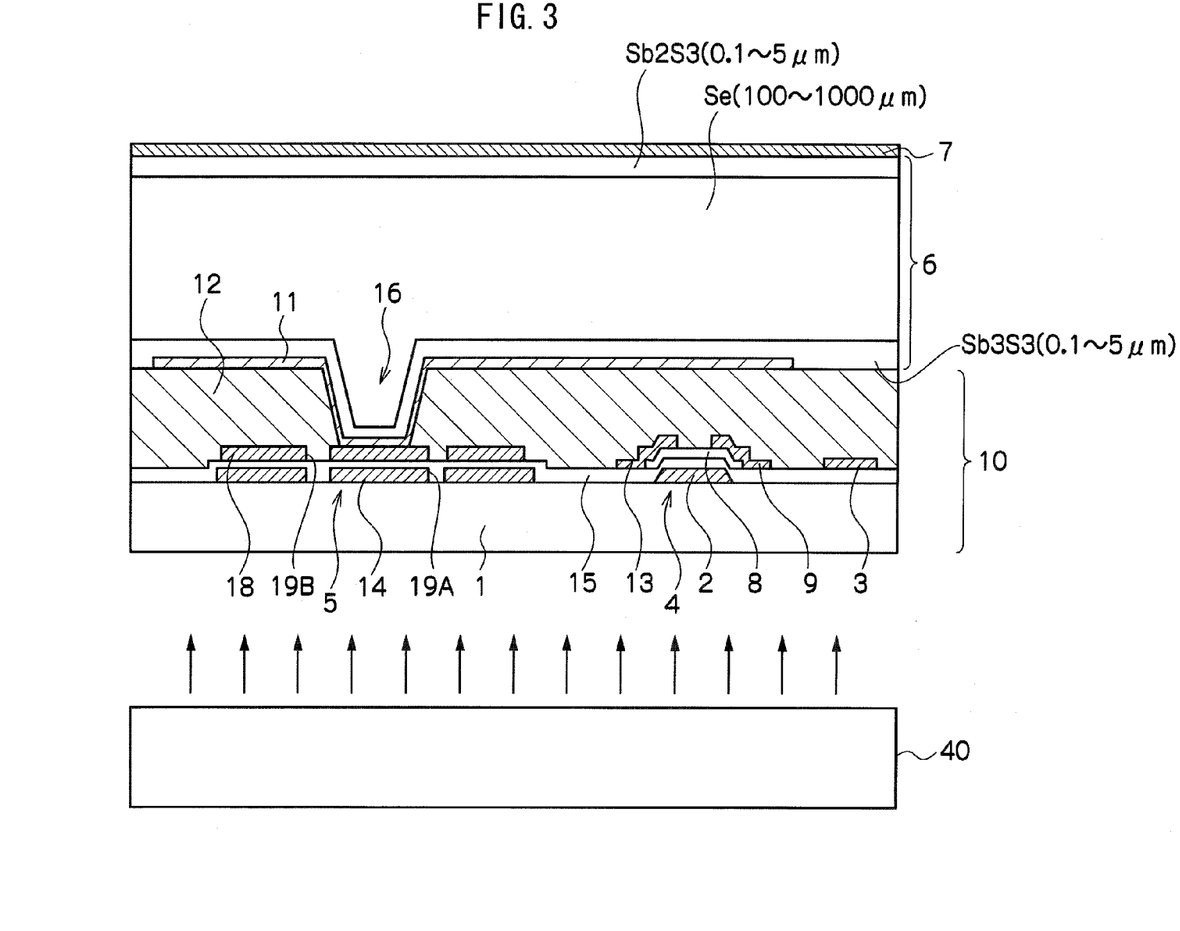
FIG. 3 is a sectional view of the TFT active matrix substrate taken along the line A-A of FIG. 2 according to the exemplary embodiment of the present invention.

As shown in FIG. 3, the TFT active matrix substrate 10 according to the exemplary embodiment is composed of a semiconductor film 6 and a bias electrode 7 formed sequentially, and the semiconductor film 6 has electromagnetic wave conductivity and the bias electrode 7 is connected to a high voltage power supply. When electromagnetic waves such as X-rays are radiated to the semiconductor film 6, it generates charges (electrons-positive holes) therein. That is, the semiconductor film 6 has the electromagnetic wave conductivity and converts image information obtained by the X-rays into charge information. Further, the semiconductor film 6 is composed of, for example, an amorphous a-Se (amorphous selenium) containing selenium as a main component. Here, the main component means that the content of selenium is 50% or more. The semiconductor film 6 has often a plurality of semiconductor film layers or insulation film layers formed on and under it for the purpose of improving characteristics and a manufacturing yield. It is assumed that the semiconductor film 6 according to the exemplary embodiment is composed of 0.1 to 5 μm thick $Sb_2S_3$ layers disposed on and under a Se layer having a thickness of 100 to 1000 μm and laminating the plurality of sensor layers (here, three layers). As described above, when the X-rays are directly converted into charges using amorphous a-Se, since the sensor layers are relatively thick, generated charges cannot be sufficiently accumulated by a charge collection electrode 11. Accordingly, in the TFT active matrix substrate 10 according to the exemplary embodiment, the charge accumulation capacitance 5 is provided to accumulate the generated charges.

A backlight 40 is disposed below the TFT active matrix substrate 10 to radiate light onto the interface between the lower sensor layer and the active matrix substrate. Although the illuminance and the wavelength of the backlight 40 greatly depends on the material of the sensor layers, when an ordinary semiconductor material is used as the material of the sensor layers, it is preferable that the illuminance and the wavelength of the backlight 40 be those of visible light.

How the layers of the TFT active matrix substrate 10 according to the exemplary embodiment are arranged will be explained below in detail.

The TFT active matrix substrate 10 has a glass substrate 1, a gate electrode 2, a pair of lower accumulation capacitance electrodes 14, a gate insulation film 15, a semiconductor layer 8, a source electrode 9, a drain electrode 13, a pair of upper accumulation capacitance electrodes 18, the data wirings 3, an interlayer insulation film 12, and the charge collection electrode 11.

As shown in FIG. 2, each scan wiring 101 is connected to the gate electrode 2. The gate electrode 2 and the scan wiring 101 are formed of the same metal layer, and a low resistor wiring material such as Al, Al alloy is ordinarily used. Further, each of accumulation capacitance wirings 102 is connected to the lower accumulation capacitance electrodes 14, and the lower accumulation capacitance electrodes 14 and the accumulation capacitance wiring 102 are formed of the same metal layer. A plurality of rectangular openings 19A are formed to each of the lower accumulation capacitance electrodes 14.

Further, the TFT switch 4 is composed of the gate electrode 2, the gate insulation film 15, the source electrode 9, the drain electrode 13, the semiconductor layer 8. The charge accumulation capacitance 5 is composed of the lower accumulation capacitance electrodes 14, the gate insulation film 15, and the upper accumulation capacitance electrodes 18.

The glass substrate 1 acts as a support substrate, and, for example, a non-alkali glass substrate (for example, #1737 manufactured by Corning) may used as the glass substrate 1.

As shown in FIG. 1, the scan wirings 101 and data wirings 3 are electrode wirings disposed in a grid-shape, and the TFT switch 4 is formed to each intersecting point thereof as shown in FIG. 2. The TFT switch 4 is a switching device and has the source electrode 9 thereof is connected to a data wiring 3 and the drain electrode 13 thereof is connected to the upper accumulation capacitance electrodes 18.

The gate insulation film 15 is composed of $SiN_x$, $SiO_x$, and the like. The gate insulation film 15 is disposed so as to cover the gate electrode 2, the scan wirings 101, the lower accumulation capacitance electrodes 14, and the accumulation capacitance wirings 102. The portion of the gate insulation film 15 located on the gate electrode 2 acts as a gate insulation film in the TFT switch 4, and the portions thereof located on the lower accumulation capacitance electrodes 14 act as dielectric layers in the charge accumulation capacitance 5. That is, the charge accumulation capacitance 5 is formed of the superimposed region of the lower accumulation capacitance electrodes 14 and the upper accumulation capacitance electrodes 18 formed of the same layer as the gate electrode 2.

Further, the semiconductor layer 8 acts as a channel portion of the TFT switch 4 as well as a current path connecting the source electrode 9 connected to a data wiring 3 to the drain electrode 13 connected to the upper accumulation capacitance electrodes 18. In general, amorphous silicon is used for the semiconductor layer 8. A contact layer is formed on the surface of the semiconductor layer 8 so that the semiconductor layer 8 is in good contact with the source electrode 9 and the drain electrode 13, and ordinarily an amorphous silicon layer added with impurities is used for the contact layer.

The data wirings 3, the source electrode 9 and the drain electrode 13 of the TFT switch 4, and the upper accumulation capacitance electrodes 18 are formed of the same metal layer which is disposed on the gate insulation film 15 and the semiconductor layer 8. A low resistance wiring material such as Al, Al alloy is ordinarily applied to these layers. The source electrode 9 is connected to a data wiring 3, and the drain electrode 13 is connected to the upper accumulation capacitance electrodes 18. As described above, the accumulation capacitance (Cs capacitance) is arranged by superimposing the lower accumulation capacitance electrodes 14 and the upper accumulation capacitance electrodes 18.

Further, each of the upper accumulation capacitance electrodes 18 have openings 19B formed thereto so that they are in coincidence with the openings 19A of each of the lower accumulation capacitance electrodes 14. As shown in the figure, the upper openings 19A are formed slightly larger than the lower openings 19B so that an accumulation capacitance is not changed even if they are offset in the positional alignment performed in a photolithography process (here, 2 μm on each side). Although an exposure device is offset about 1 μm in alignment, the change of the capacitance can be suppressed by the above arrangement.

The interlayer insulation film 12 is ordinarily composed of a kind of organic or inorganic insulation film materials called a flattening film material or an interlayer insulation material (for example, acrylate resin) and disposed to flatten the lower layer of the charge collection electrode 11 and to reduce the capacitances of the charge collection electrode 11 and the data wirings 3, and the scan wirings 101 and has a film thickness of 1 to 4 μm and a dielectric constant of 2 to 4. A contact hole 16 passes through the interlayer insulation film 12, and the charge collection electrode 11 disposed above the interlayer insulation film 12 is connected to the upper accumulation capacitance electrodes 18 through the contact hole 16.

The charge collection electrode 11 is composed of amorphous transparent conductive/oxide film (ITO). The charge collection electrode 11 is formed so as to bury the contact hole 16 and layered on the source electrode 9 and the drain electrode 13, and on the upper accumulation capacitance electrodes 18. The charge collection electrode 11 electrically conducts to the semiconductor film 6, and the charges generated in the semiconductor film 6 can be collected by the charge collection electrode 11. As described above, since the charge collection electrode 11 is composed of the transparent electrode, light passes through the semiconductor film 6 from the glass substrate 1 side.

As described above, the gate electrode 2, the scan wirings 101, the lower accumulation capacitance electrodes 14, and the accumulation capacitance wirings 102 are disposed on the glass substrate 1. The semiconductor layer 8 and the data wirings 3 are formed above the gate electrode 2 through the gate insulation film 15. The source electrode 9 and the drain electrode 13 are formed on the semiconductor layer 8. The upper accumulation capacitance electrodes 18 are layered on the layer which constitutes the charge accumulation capacitance 5. Further, the interlayer insulation film 12 is formed on the upper accumulation capacitance electrodes 18, the data wirings 3, the source electrode 9, and the drain electrode 13. The charge collection electrode 11 is disposed on the interlayer insulation film 12, that is, on the uppermost layer of the TFT active matrix substrate 10. The charge collection electrode 11 is connected to the TFT switch 4 through the upper accumulation capacitance electrodes 18 and the drain electrode 13.

Next, an operating principle of the radiation image detection device 100 having the structure described above will be briefly explained.

When X-rays are radiated to the semiconductor film 6 in a state that a predetermined bias voltage is applied between the bias electrode 7 and the lower accumulation capacitance electrodes 14 from a high voltage power supply, charges (electron-hole pairs) are generated in the semiconductor film 6. Since the semiconductor film 6 is electrically connected in series to the charge accumulation capacitance 5, the electrons generated in the semiconductor film 6 migrates to a positive electrode side, and the holes generated therein migrate to a negative electrode side with a result, the charges are accumulated in the charge accumulation capacitance 5.

The charges accumulated in the charge accumulation capacitances 5 can be fetched to the outside through the data wirings 3 by turning ON the TFT switches 4 in response to a signal input to the scan wirings 101.

Since all the scan wirings 101, the data wirings 3, the TFT switches 4, and the charge accumulation capacitances 5 are disposed in an XY matrix state, the image information of the X-rays can be two-dimensionally obtained by sequentially scanning the signals input to the scan wirings 101 and detecting the signals from each of the data wirings 3.

Incidentally, in the TFT active matrix substrate 10 according to the exemplary embodiment, since the openings 19A and the opening 19B are formed to the upper accumulation capacitance electrodes 18 and the lower accumulation capacitance electrodes 14 of the charge accumulation capacitance 5, respectively, light can be radiated to the respective sensor layers of the semiconductor film 6 located above the charge accumulation capacitances 5.

According to the explanation of JP-A No. 2004-33659 disclosed in Background Art, trap charges are generated between the pixel electrodes by the light radiated from the backlight 40 and a positive potential is created between the pixel electrodes by the trap charges. However, as to this matter, the inventors consider as described blow.

Figure 4:
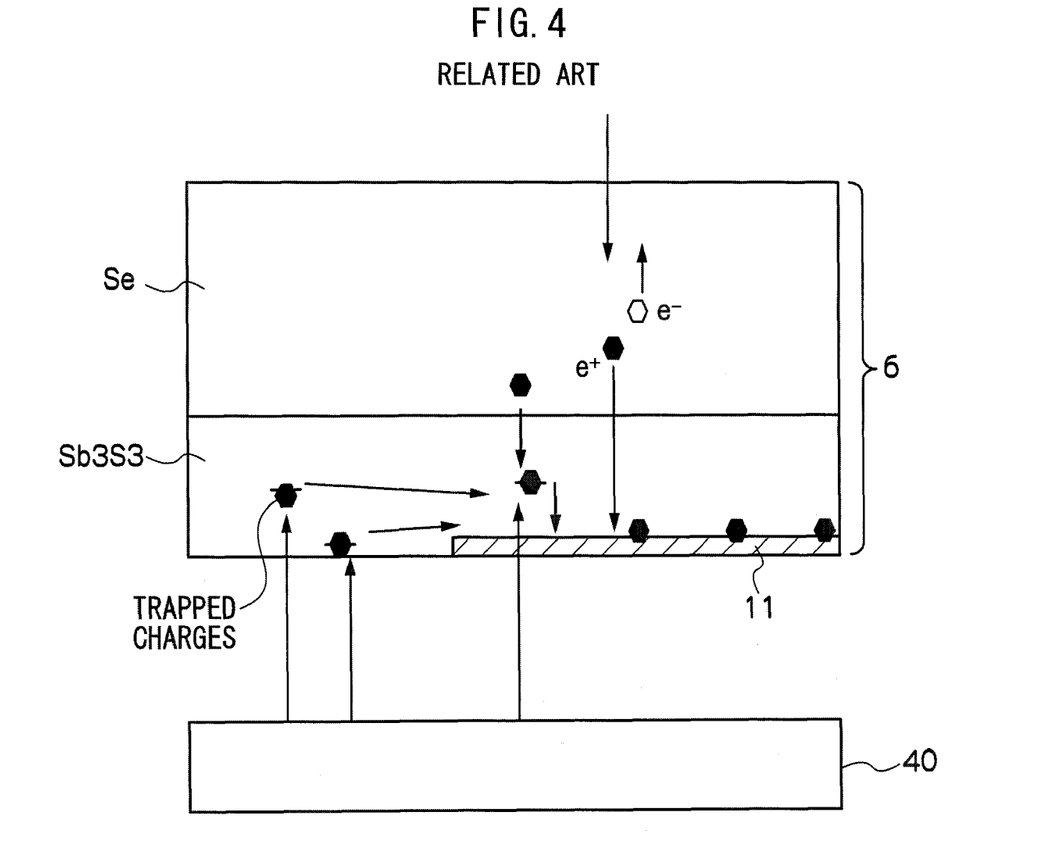
FIG. 4 is a schematic view schematically showing a behavior of the charges in a semiconductor layer of a TFT active matrix substrate according to a related art.

A lot of defect levels exist in the interface between the sensor layer and the TFT substrate. Many of the charges drifted to the charge collection electrode 11 side by the positive bias are collected to the charge collection electrode 11. However, when no light is radiated, there exist a lot of charges which are trapped by the defect level described above. Thus, in the technology disclosed in JP-A No. 2004-33659, the trapped charges are excited and caused to flow into the charge collection electrode 11 by radiating light to the TFT active matrix substrate from the backlight 40 as shown in FIG. 4. That is, the positive potential is not created by the trap charges, and positive charges are excited by the light and discharged to the collection electrode side.

Figure 5:
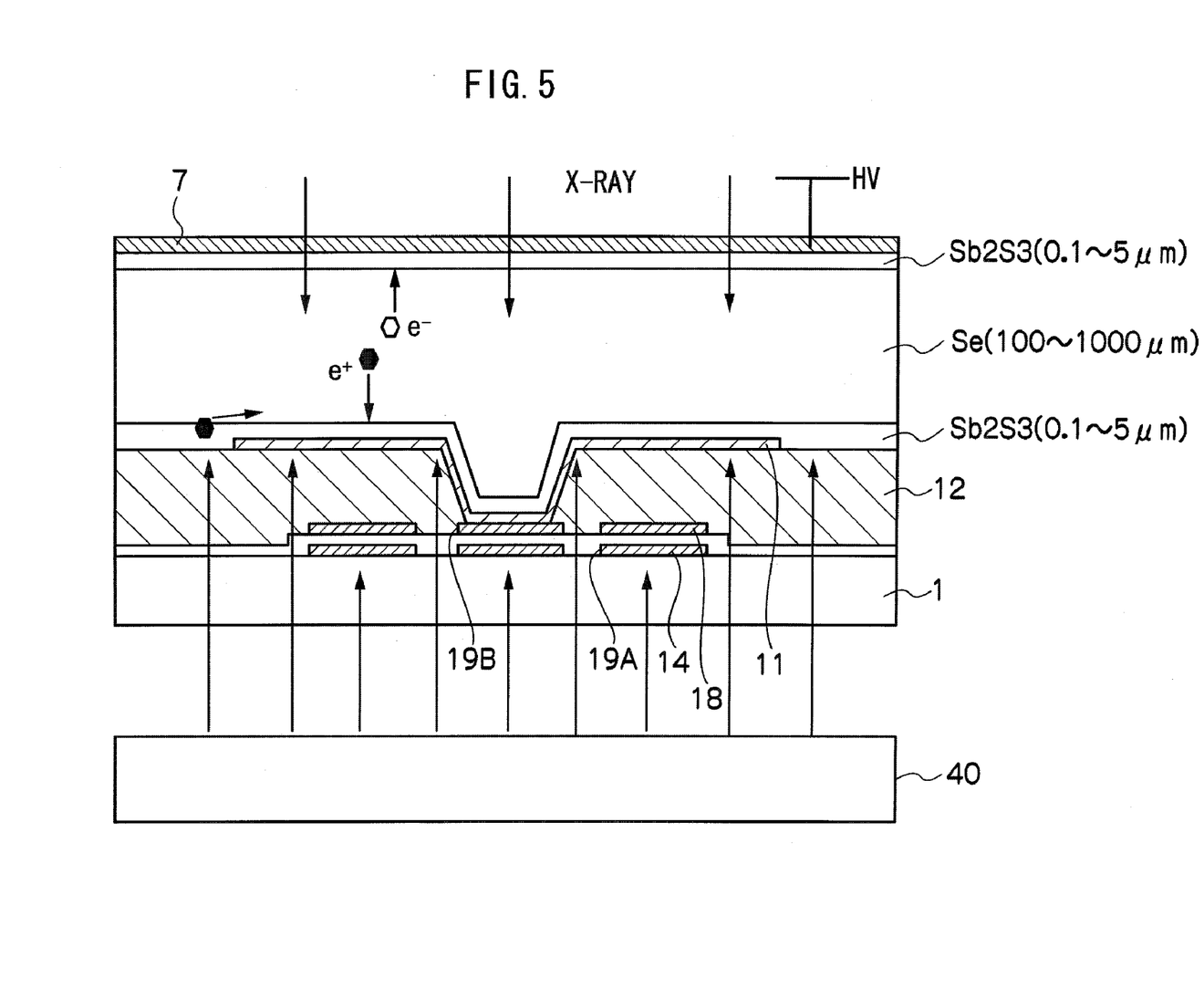
FIG. 5 is a schematic view schematically showing a behavior of the charges in the semiconductor layer of the TFT active matrix substrate according to the exemplary embodiment of the present invention.

This effect is effective also in a region other than between pixel electrodes. As shown in FIG. 5, a lot of defect levels also exist in the sensor layer (here, $Sb_2S_3$ layer as the lowermost layer), in the interface between the semiconductor layer and the TFT substrate, and in the interface between a plurality of the semiconductor layers. Since these defect levels trap the holes just above the charge collection electrode 11, remaining image characteristics are deteriorated and the generated charges are partly remain in the sensor layer, thereby sensitivity is made unstable.

To cope with the above problem, the openings 19A and the opening 19B are formed to the upper accumulation capacitance electrodes 18 and the lower accumulation capacitance electrodes 14 of the charge accumulation capacitance 5 in the exemplary embodiment so that light can be radiated to the sensor layer just above the charge collection electrode 11. With this arrangement, since charges are excited also just above the charge collection electrode 11 and caused to flow into the charge collection electrode 11, the remaining image characteristics can be improved, and since the holes trapped by the defect level can be reduced, sensitivity stability can be also improved.

More specifically, in, for example, the TFT active matrix substrate having the arrangement of the related art shown in FIG. 11, since the openings 19A and 19B are not formed to upper accumulation capacitance electrodes 18' and lower accumulation capacitance electrodes 14' of a charge accumulation capacitance 5,' light is shielded by the upper accumulation capacitance electrodes 18' and the lower accumulation capacitance electrodes 14'. As a result, light cannot be radiated from the backlight 40 to respective sensor layers of a semiconductor film 6' located above the charge accumulation capacitance 5'. Further, it is not known in the related art that the sensitivity stability and the remaining image characteristics of the sensor layer can be improved by radiating light to the region.

TABLE 1

| Time (sec) | Related example | | Present invention |
|---|---|---|---|
| | Without backlight | With backlight | |
| 1 | 23.00% | 9.00% | 3.00% |
| 10 | 0.80% | 0.25% | 0.04% |
| 100 | 0.30% | 0.03% | 0.00% |

Table 1 shows an example of the result of detection of the ratio of remaining charges determined by performing an image detection for fetching charges from the charge accumulation capacitance 5 and then fetching charges again after a predetermined time passed in the TFT active matrix substrate 10 according to the exemplary embodiment (shown as "present invention" in Table 1) and in the TFT active matrix substrate of the arrangement of the related art shown in FIG. 11 (shown as "Related example" in Table 1). Note that in the TFT active matrix substrate 10 of the arrangement of the related art, the ratio of remaining charges was determined when light was radiated from the backlight 40 (with backlight) and when light was not radiated therefrom (without backlight).

As shown in Table 1, when X-rays were radiated on a certain condition, (in particular, when the amount of X-ray was high), that is, when light was not radiated in the TFT active matrix substrate of the arrangement of the related art, charges were detected in the amount of 23% even after one second passed and remained in the amount of 0.8% even after 10 seconds passed. Further, even if light was radiated from the backlight 40, about 100 seconds were necessary to reduce the remaining amount of the charges to 0.05% or less.

In contrast, in the TFT active matrix substrate 10 according to the exemplary embodiment, the remaining amount of the charges could be reduced to 0.04% after 10 seconds passed.

As described in detail above, according to the exemplary embodiment, the image detection device includes the semiconductor film 6, which is formed above the glass substrate 1 and generates charges when X-rays are radiated thereonto, the TFT active matrix substrate 10, which has the pair of upper accumulation capacitance electrodes 18 and the pair of lower accumulation capacitance electrodes 14 each disposed in confrontation with each other, the plurality of charge accumulation capacitances 5, which are formed between the semiconductor film 6 and the glass substrate 1 and accumulate the charges generated by the semiconductor film 6 as the information of the pixels constituting an image, and the backlight 40 for radiating light to the surface of the TFT active matrix substrate 10 on the glass substrate 1 side thereof. Since the upper accumulation capacitance electrodes 18 and the lower accumulation capacitance electrodes 14 are formed such that light having at least a predetermined intensity is radiated from the backlight 40 to the regions of the semiconductor film 6 where the charge accumulation capacitances 5 are formed, the charges, which are trapped to the regions of the semiconductor film 6 where the charge accumulation capacitances 5 are formed, are excited by the light from the backlight 40. As a result, the sensitivity stability and the remaining image characteristics may be improved.

Note that the intensity of the light to be radiated may be previously determined by an experiment and the like so that it can excite the charges trapped in the regions where the accumulating portions of the semiconductor layer are formed according to the layer arrangement of the semiconductor layer.

Figure 6:
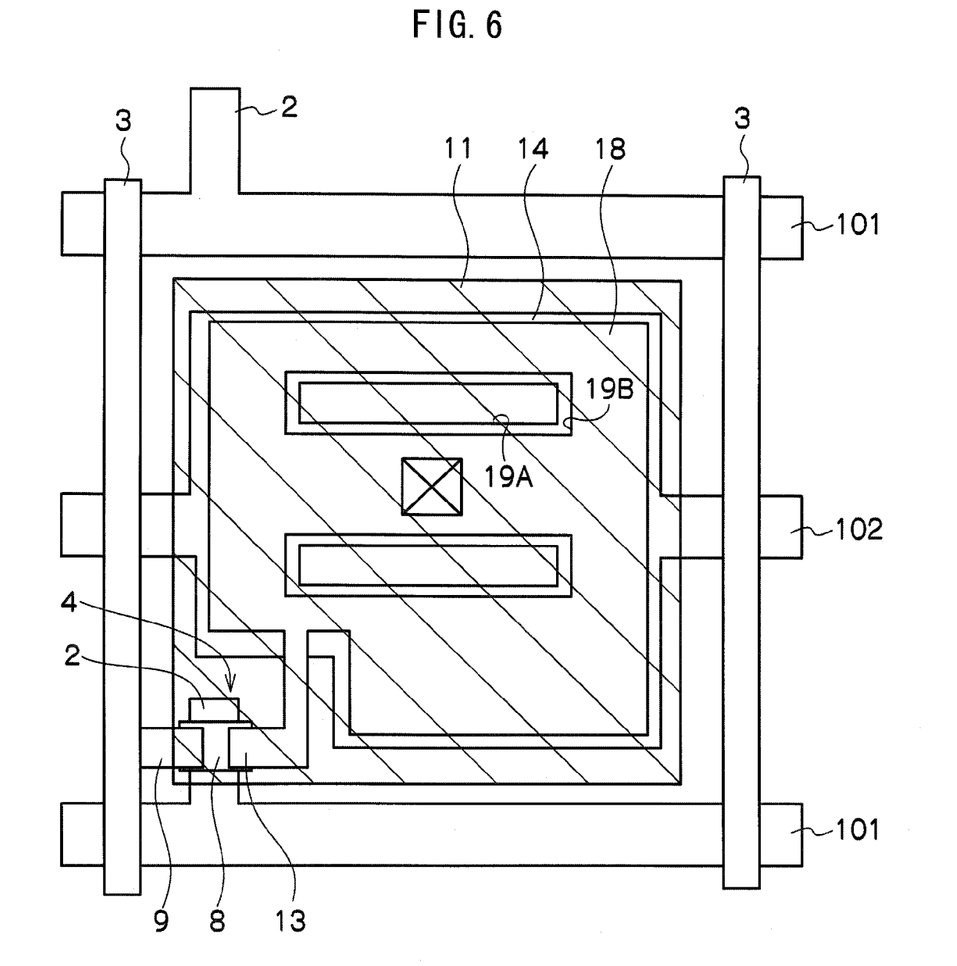
FIG. 6 is a plan view showing another structure of the TFT active matrix substrate according to the exemplary embodiment of the present invention.
Figure 7:
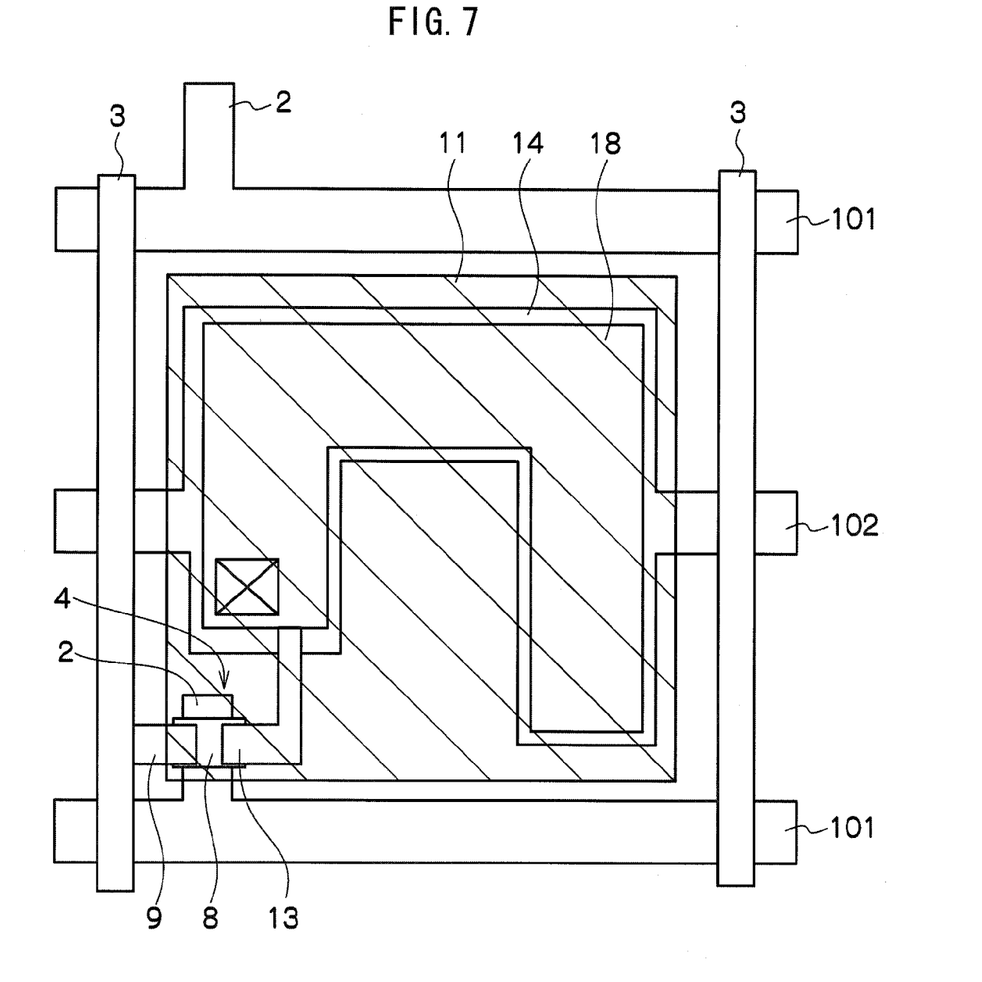
FIG. 7 is a plan view showing still another structure of the TFT active matrix substrate according to the exemplary embodiment of the present invention.
Figure 8:
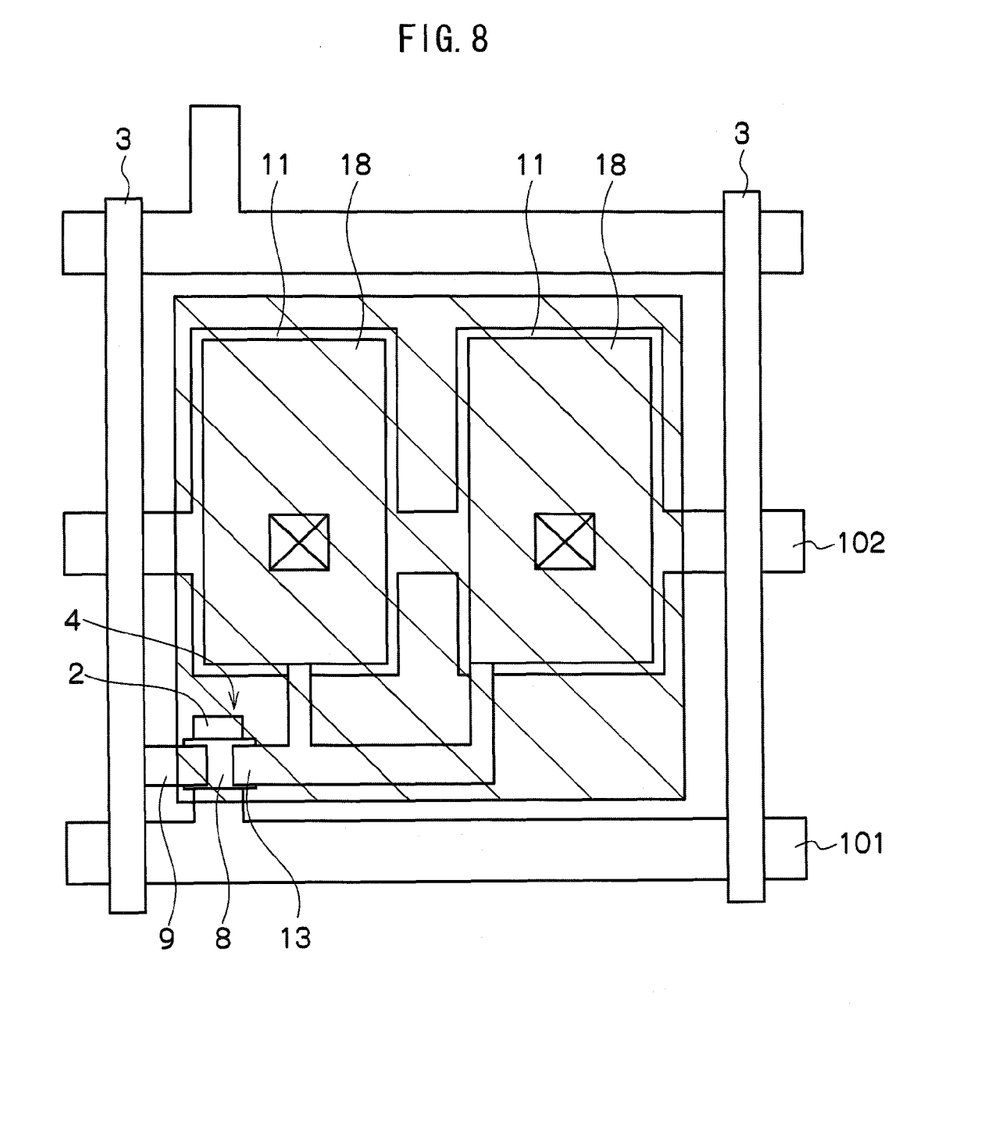
FIG. 8 is a plan view showing a further structure of the TFT active matrix according to the exemplary embodiment of the present invention.

Note that, as shown in FIG. 2, the case that the openings 19A and 19B, which are formed to the upper accumulation capacitance electrodes 18 and the lower accumulation capacitance electrodes 14, are formed to the rectangular shape, is explained in the exemplary embodiment, the invention is not limited thereto, and the openings 19A and 19B may be formed to a slit shape as shown in FIG. 6. Further, as shown in FIG. 7, the upper accumulation capacitance electrodes 18 and the lower accumulation capacitance electrodes 14 may be formed to a C-shape so that each of them is arranged as an electrode having a light transmission path in the center portion thereof. Furthermore, as shown in FIG. 8, each of the upper accumulation capacitance electrode 18 and the lower accumulation capacitance electrode 14 may be divided into a plurality of portions (in FIG. 8, each divided into two portions) and the respective upper accumulation capacitance electrodes 18 may be connected in parallel with the drain electrode 13. Any of these cases can obtain the same effect as the exemplary embodiment.

Figure 9A:
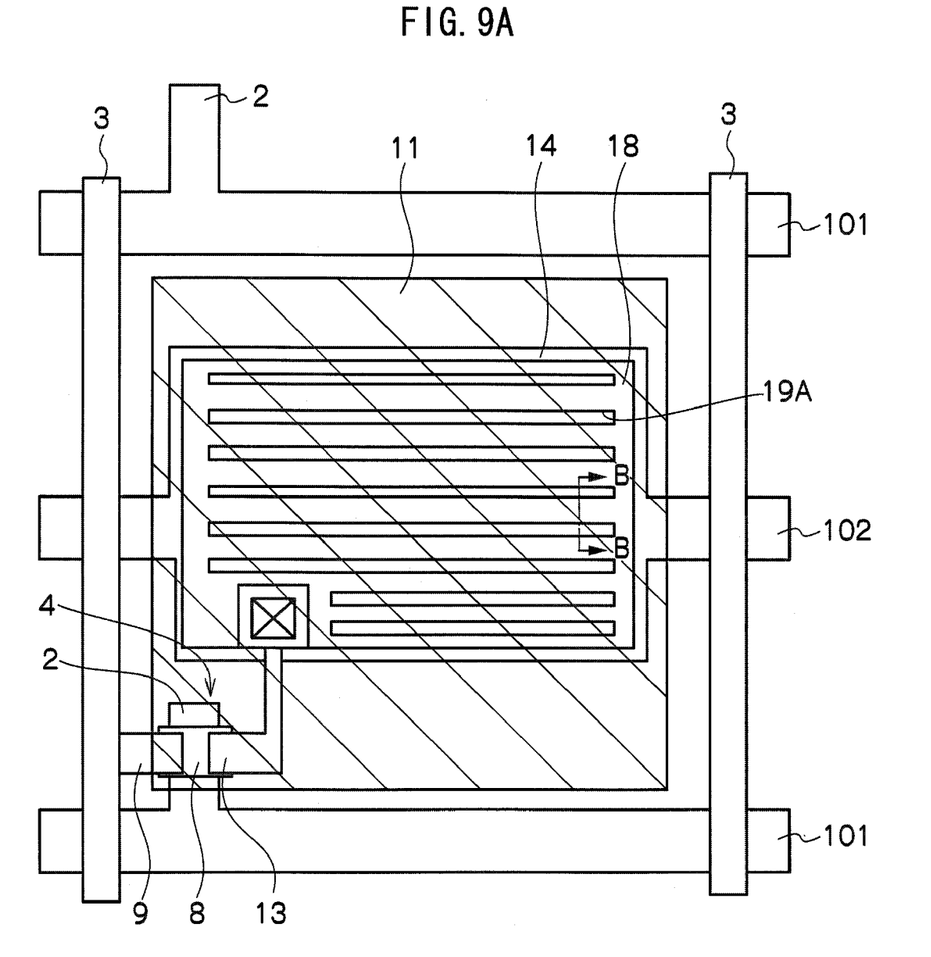
FIG. 9A is a plan view showing a structure of the TFT active matrix substrate according to the exemplary embodiment of the present invention.
Figure 9B:
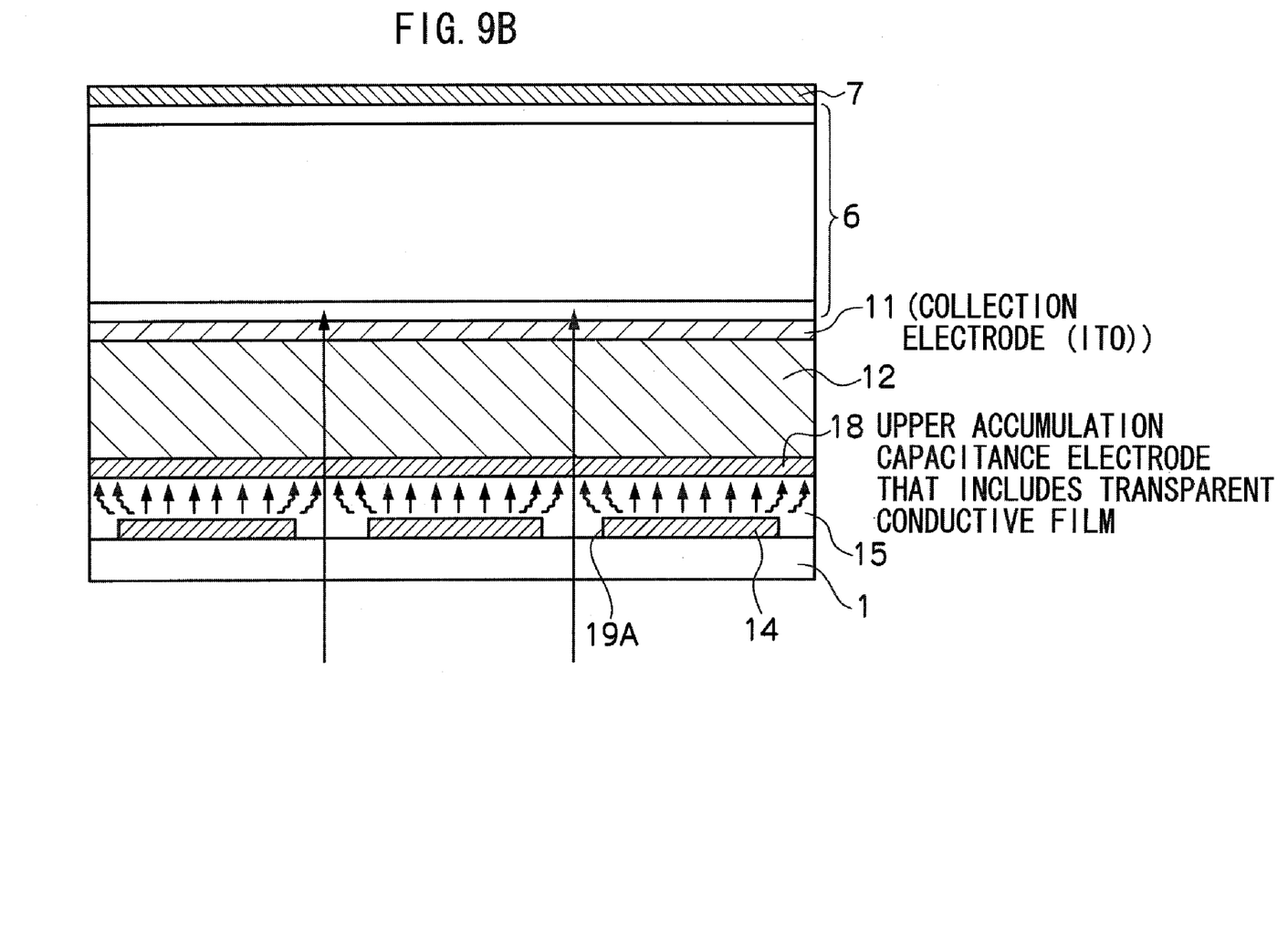
FIG. 9B is a sectional view taken along the line B-B of FIG. 9A.

Further, as shown in FIGS. 9A and 9B, a plurality of thin slit-shaped openings 19A may be formed to the lower accumulation capacitance electrode 14, the upper accumulation capacitance electrode 18 may be formed separately from the layer of the source electrode 9, the upper accumulation capacitance electrode 18, which is composed of a conductive member having a transparent property such as ITO, may be formed on a protective insulation film separately formed on the layer of the source electrode 9, and the upper accumulation capacitance electrode 18 may be electrically connected to the drain electrode 13 through a contact hole formed to the protective insulation film. With this arrangement, since the upper accumulation capacitance electrode 18 is transparent, it is not necessary to form openings such as slits with a result that the reduction of an accumulation capacitance due to the openings can be suppressed by an extended electric field. Note that FIG. 9B is a sectional view taken along the line B-B of FIG. 9A.

The arrangement of the radiation image detection device 100 explained in the exemplary embodiment (refer to FIG. 1) and the arrangement of the TFT active matrix substrate 10 (FIGS. 2 to 9B) are only examples and may be appropriately modified within the range which does not depart from the gist of the invention.

What is claimed is:

1. An image detection device comprising:
a sensor panel that includes a semiconductor layer, which is formed on a substrate formed of a member having a light transmitting property and generates charges in response to X-rays radiated thereto, two pairs of electrodes disposed opposing each other, and a plurality of accumulation portions formed between the semiconductor layer and the substrate that accumulate the charges generated by the semiconductor layer as pixel information constituting an image, wherein the two pairs of electrodes are included in the respective accumulation portions; and
a light that radiates light to the surface of the sensor panel on the substrate side thereof,
wherein the respective electrodes of the accumulation portions are formed so that light having at least a predetermined intensity is radiated from the light to the regions of the semiconductor layer where the accumulation portions are formed.

2. The image detection device of claim 1, wherein an opening is formed in each of the electrodes of the accumulating portions so that the light having at least the predetermined intensity is radiated from the light to the regions of the semiconductor layer where the accumulation portions are formed.

3. The image detection device of claim 2, wherein each opening is formed in a slit shape.

4. The image detection device of claim 2, wherein each opening is formed in a rectangular shape.

5. The image detection device of claim 2, wherein each electrode includes a plurality of openings.

6. The image detection device of claim 1, wherein each of the electrodes of the accumulation portions is divided into a plurality of electrodes.

7. The image detection device of claim 1, wherein each of the electrodes of the accumulation portions is formed of a conductive member having a light transmitting property.

8. The image detection device of claim 1, wherein the semiconductor layer includes amorphous selenium as a main component.

9. The image detection device of claim 1, wherein the semiconductor layer is formed by layering a plurality of semiconductor layers each including a different material.

* * * * *